(12) United States Patent
Stark

(10) Patent No.: US 7,573,992 B1
(45) Date of Patent: Aug. 11, 2009

(54) TELECOMMUNICATIONS SERVICE PROVISIONING UTILIZING GROUP SUBSCRIPTION PLAN

(75) Inventor: Daniel Stark, Lebanon, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 859 days.

(21) Appl. No.: 10/945,296

(22) Filed: Sep. 20, 2004

Related U.S. Application Data

(60) Provisional application No. 60/558,971, filed on Apr. 2, 2004.

(51) Int. Cl.
*H04M 15/00* (2006.01)
(52) U.S. Cl. .............. 379/121.02; 379/114.05; 379/114.1; 379/114.12; 705/14
(58) Field of Classification Search ............ 379/111, 379/114.01, 114.03, 114.06, 114.1, 114.12, 379/121.02, 121.04, 127.04, 127.05, 114.05; 705/14, 34
See application file for complete search history.

(56) References Cited

U.S. PATENT DOCUMENTS

| | | | | |
|---|---|---|---|---|
| 6,029,141 A | * | 2/2000 | Bezos et al. | 705/27 |
| 7,281,617 B2 | * | 10/2007 | Puiu | 192/35 |
| 2002/0198782 A1 | * | 12/2002 | Shorter | 705/14 |
| 2003/0200144 A1 | | 10/2003 | Antonucci et al. | |
| 2004/0122734 A1 | | 6/2004 | Schleicher et al. | |
| 2007/0250388 A1 | * | 10/2007 | Walker et al. | 705/14 |
| 2008/0069324 A1 | * | 3/2008 | Bevente et al. | 379/114.22 |

* cited by examiner

*Primary Examiner*—Binh K Tieu

(57) ABSTRACT

Disclosed is a method and apparatus for providing telecommunication services based on customer groups. A customer group is offered a service plan that provides an incentive to early subscribers in the form of a more attractive pricing plan (i.e., discounts). For example, a particular subscriber may be provided a discount for each customer in the group who becomes a subscriber after the particular subscriber. The discounts and pricing plan may also be based, at least in part, on the total number of customers in the group that become subscribers. Further, in order to reduce customer churn, customer discounts or other incentives may be applied toward the end of a subscription plan period. Further, subscriber discounts and/or credits may be banked in a subscriber account.

16 Claims, 4 Drawing Sheets

TELECOMMUNICATIONS SERVICE PROVISIONING UTILIZING GROUP SUBSCRIPTION PLAN

CROSS-REFERENCE TO RELATED APPLICATIONS

This application claims the benefit of U.S. Provisional Application No. 60/558,971, filed Apr. 2, 2004, which is incorporated herein by reference.

This application is related to U.S. patent application Ser. No. 10/945,300, filed Sep. 20, 2004 and entitled Telecommunications Service Provisioning and Banking of Customer Credits, which is incorporated herein by reference.

BACKGROUND OF THE INVENTION

The present invention relates to the provisioning of telecommunication services in connection with subscription plans.

Telecommunications service providers operate in a highly competitive market. There are often multiple service providers operating in any given geographic area, and customers may choose among the multiple service providers for their telecommunications services. Since consumers often view the actual service as fungible (e.g., long distance telephone service) telecommunication service providers spend a large amount of resources on marketing activities. One such marketing activity is the offering of various types of service plans to customers. Often, these plans are based on cost structure and pricing rather than on the actual service being provided.

For example, one such known marketing plan is the offering of reduced rates to telephone calls placed to customers who use the same service provider as the calling party. This encourages people who talk to each other often (e.g., family members or friends) to use the same service provider. Of course, this is just one example and there are various telecommunication services and pricing plans available to customers from the various telecommunication service providers.

One well known problem in this area is customer churn, whereby customers switch from one service provider to another. This churn is a result of the highly competitive market and the aggressive marketing techniques of the service providers.

What is needed is an improved technique for providing telecommunication services that will initially attract customers to a service provider and that will encourage such customers to remain with the service provider.

BRIEF SUMMARY OF THE INVENTION

It has been realized that there are advantages to marketing telecommunication services to customer groups in accordance with the principles of the present invention. One such group may be based on geography. Due to the cost structure for providing certain types of services, geographically localized marketing is often a cost effective marketing tool. For example, if significant investment in local infrastructure is required to offer a certain service to local subscribers, then local marketing is most effective to obtain a return on the fixed cost investment. One example of such a service is a broadband powerline communication system (BPL—in which power lines are used to transmit data) which requires localized investment in the physical powerline transmission facilities. Thus, localized geographic marketing is desirable in order to attempt to recoup the required initial investment.

Of course, there are other types of group marketing, other than geography based, which would benefit from more focused marketing as well. These include groups based on cost of servicing customers, demographics, affiliations, family relationships, organization membership, or any other criteria.

In accordance with an embodiment of the invention, a customer group is offered a service plan that provides an incentive to early subscribers in the form of a more attractive pricing plan. For example, a particular subscriber may be provided a discount for each customer in the group who becomes a subscriber after the particular subscriber. Further, the discounts and pricing plan may be based, at least in part, on the total number of customers in the group that become subscribers, where more subscribers translates into more attractive pricing to all customers in the group. This provides a communal interest in having a large number of people sign up for the service.

Another advantage of the present invention is the reduction of customer churn. In accordance with one aspect of the invention, customer discounts may be provided at the end of a subscription plan period, thus encouraging customers to remain plan subscribers for the entire plan period. In accordance with yet another aspect of the invention, remaining a subscriber for the entire plan period also provides other subscribers with increased discounts, thus again providing a communal interests in all subscribers remaining under the plan.

These and other advantages of the invention will be apparent to those of ordinary skill in the art by reference to the following detailed description and the accompanying drawings.

DETAILED DESCRIPTION

Figure 1:
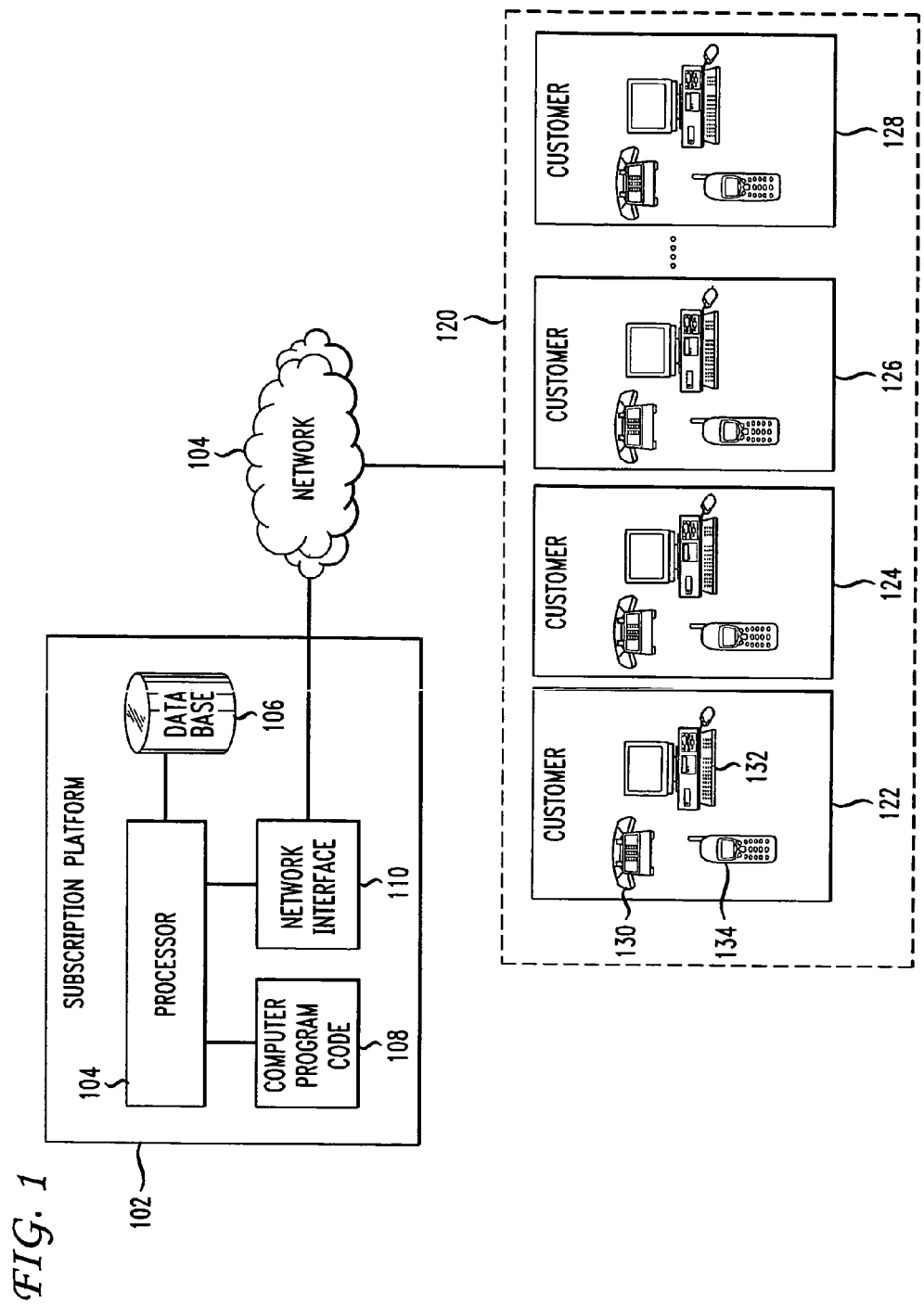
FIG. 1 shows a high level overview of a telecommunications network in which the principles of the present invention may be implemented.

FIG. 1 shows a high level overview of a telecommunications network in which the principles of the present invention may be implemented. FIG. 1 shows a subscription platform 102 connected to network 104. Subscription platform 102 is a telecommunications network node which may be used to implement the present invention. In the embodiment shown, the subscription platform 102 is a programmable computer comprising a processor 104 which is capable is executing stored computer program code 108. The stored computer program code 108 defines the steps to be performed by the processor 104. The subscription platform 102 also includes a network interface 110 for communicating with the telecommunication network 104. The subscription platform 102 also includes a database 106 for storing required data (e.g., customer or subscriber records) as will be discussed in further detail below. One skilled in the art will recognize that the subscription platform 102 shown in FIG. 1 is a high level block diagram, and a network node implemented a subscription platform would generally contain other well known elements, which are not shown in FIG. 1. The steps performed by the subscription platform 102, under control of the processor 104 and stored computer program code 108, will be described in conjunction with the flowcharts of FIGS. 2-5.

The network 104 may be any type of known telecommunications network, including but not limited to the public switched telephone network (PSTN), a wireless network, a data network (e.g., Internet), a local area network (LAN), or a wide are network (WAN). An appropriate network interface 110 would be used depending upon the type of network. Further, the subscription platform 102 could be in communication with multiple networks, in which case the subscription platform 102 would include multiple network interfaces as necessary.

Also illustrated in FIG. 1 is a plurality of customers 122, 124, 126 ... 128. These customers are identified as a customer group, as shown by dotted line box 120. In one embodiment of the invention, a customer group is identified by the service provider for focused marketing efforts. The customer group is a group of customers to whom a particular subscription plan will be offered. This customer group may be identified based on geography (e.g., area where infrastructure investment has been made), cost of servicing customers, demographics, affiliations, family relationships, organization membership, or some other criteria. The customer group may include any number of customers (e.g., 50). The number of customers in the customer group will depend upon the particular implementation. Customer group 120 shown in FIG. 1 may be any identified group of customers or potential customers, and there is no requirement that they be geographically co-located. These customers are shown together in FIG. 1 for clarity only, and in fact they could all be located in the same small geographic are, or they could be widely geographically dispersed. The customer group 120 is shown connected to network 104. Again, this single connection is shown for clarity only, and each of the customers may in fact be connected to a different network or the same network. The only requirement is that the customers are able to communicate with the subscription platform 102. To illustrate this point, for example with reference to customer 122, the customer is shown as including various devices, such as a telephone 130, computer 132, and wireless terminal 134. One skilled in the art will recognize that various communication devices are available for connection to a communications network.

As used herein, a subscription plan is a subscription based telecommunications service plan which includes any combination of telecommunication services which are offered and provided in connection with a particular pricing plan. The pricing plan is the cost to the subscriber for the particular subscription plan, and may include discounts.

Each subscription plan has an associated plan period, which defines the time period during which the subscription plan is effective. For example, the plan period may be one year. Subscription plans may be repeated during subsequent periods.

Each subscription plan also has an associated subscription period, which defines the time period during which customers in the customer group may subscribe (or "sign up") for the plan. For example, the subscription period may start 30 days prior to the plan period, and may extend half way into the plan period (e.g., assuming a one year plan period, the subscription period may extend until 6 months into the plan period). In accordance with an advantageous subscription plan, as will be described in further detail below, each time a customer subscribes to a subscription plan, the time that the customer subscribes, called the subscription time, is recorded and stored in a database. The use of such a subscription time, or timestamp, will be discussed in further detail below.

All subscribers who subscribe to a particular subscription plan are referred to as the subscriber group. Generally, although a particular customer may have several telephone numbers, such a customer will have a single billed telephone number (BTN). In one embodiment, there is a limit of one subscriber per BTN.

In accordance with one advantageous embodiment, subscribers are provided with a better pricing plan based at least in part on their subscription time. More particularly, a particular subscriber's pricing plan is discounted a particular amount for each customer in the customer group who subscribes to the subscription plan after the particular subscriber (referred to here as "subsequent customers"). Such a discount or credit is referred to as a subsequent customer credit. For example, for each customer in the customer group who subscribes after the particular subscriber, that particular subscriber may receive a credit (e.g., 1 week credit) or a percentage discount (e.g., 2% discount), to be applied to the particular subscriber's pricing plan. This type of discount and pricing plan provides incentives for customers in the customer group to sign up early for the subscription plan and receive a larger discount.

There are may variations possible for pricing and discount plans. For example, in another embodiment, the above described subsequent customer credits may be applied toward the end of the plan period (i.e., in reverse order), which encourages subscribers to remain subscribers during the entire plan period. As an example, if a particular subscriber qualifies for a 3 week subsequent customer credit, then this credit will be applied during the last 3 weeks of the plan period. Similar incentives may be implemented for other types of discounts and pricing plans.

In another variation, a particular subscriber may only receive subsequent customer credits if the customers associated with such credits are subscribers to the subscription plan at the time the credits are to be applied. For example, suppose a particular subscriber is eligible for 3 weeks worth of subsequent customer credits because three customers in the customer group subscribed to the subscription plan after the particular subscriber. Since these credits will be applied during the last three weeks of the subscription period, all three of the subsequent customers must be subscribers to the subscription plan during the last three weeks of the subscription period in order for the full 3 week credit to be applied to the particular subscriber. If only two of the subsequent customers remain subscribers, then the particular customer will only receive a two week credit. This particular variation encourages all subscribers to remain subscribers during the entire subscription period. By dropping out of the subscription plan, a subscriber not only loses his/her own subsequent customer credits, but also reduces the subsequent customer credits applied to others in the subscriber group. If a subscriber group consists, for example, of people in a particular neighborhood, subscribers that drop out will increase the cost of the subscription to their neighbors.

Figure 2:
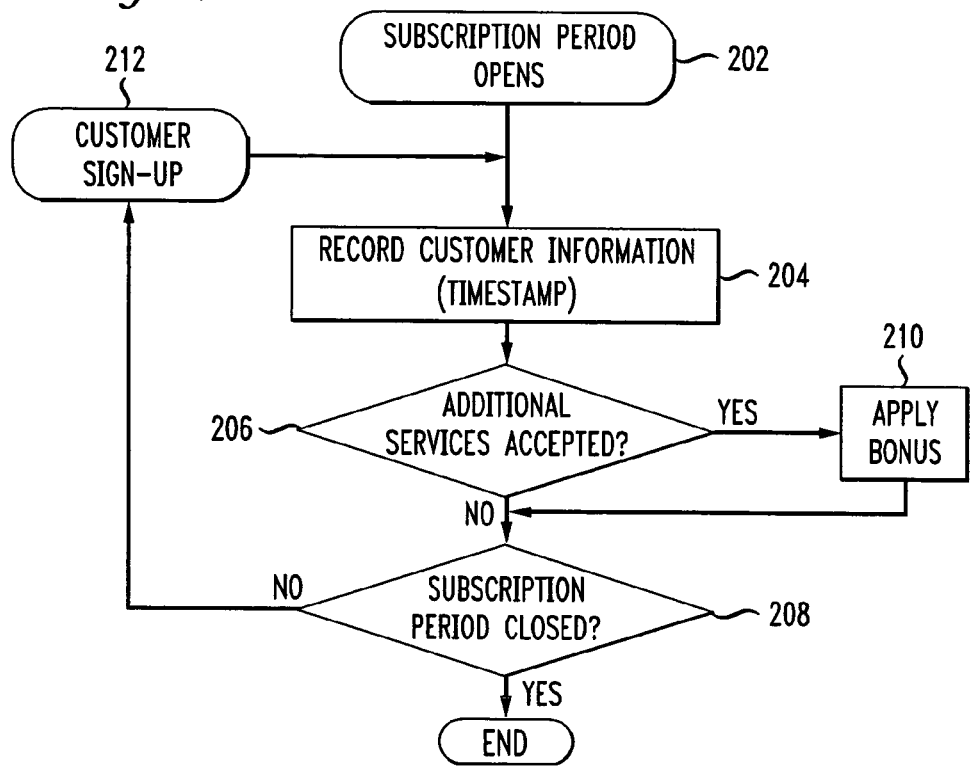
FIG. 2 is a flowchart showing the general steps to be performed during the subscription period.

A particular embodiment of the invention will now be described in conjunction with the flowcharts of FIGS. 2-5. FIG. 2 is a flowchart showing the general steps to be performed during the subscription period and controls the process of allowing customers in the customer group to subscribe to the subscription plan. First, as represented by 202, customers may only sign up for the subscription plan upon the opening of the subscription period. Thereafter, when a customer signs up in step 212 (e.g., by placing a telephone call (e.g., 800 number) to the subscription platform, accessing the subscription platform via a data network (e.g., email or www browser), or otherwise), customer information is stored in the database (step 204). One piece of such stored customer information is the time and date (sometimes referred to as a timestamp) that the customer subscribed to the service. In one embodiment of the invention, this time and date information is stored in a customer billing record. Other customer information will be stored in connection with providing the particular telecommunication services. However, the details of such other information are not required for an understanding of the present invention and therefore will not be discussed herein.

After the customer information is recorded, as an optional step, the customer may be offered additional (e.g., enhanced) services associated with the subscription plan. An example of such additional services is electronic billing. As an incentive for the customer to choose such additional services, the customer may be offered a bonus for signing up for such additional services. In one embodiment, such a bonus may take the form of a time credit applied to the customer's timestamp. For example, a one hour credit toward a customer's timestamp may render this customer's timestamp prior to the timestamp of another customer who signed up 15 minutes earlier. As a result, this other customer now becomes a subsequent customer and provides an additional subsequent customer credit to the customer who received the bonus. The step of offering addition services and determining whether the additional services have been accepted is represented as step 206. If the additional services are accepted, the appropriate bonus is applied to the customer's account in step 210.

As represented by step 208, the steps shown in FIG. 2 continue for each customer until the subscription period closes. In an optional alternate embodiment, the system may keep track of the number of subscribers already signed up and credit/discount information and provide such information to subscribers during the subscription process.

Figure 3:
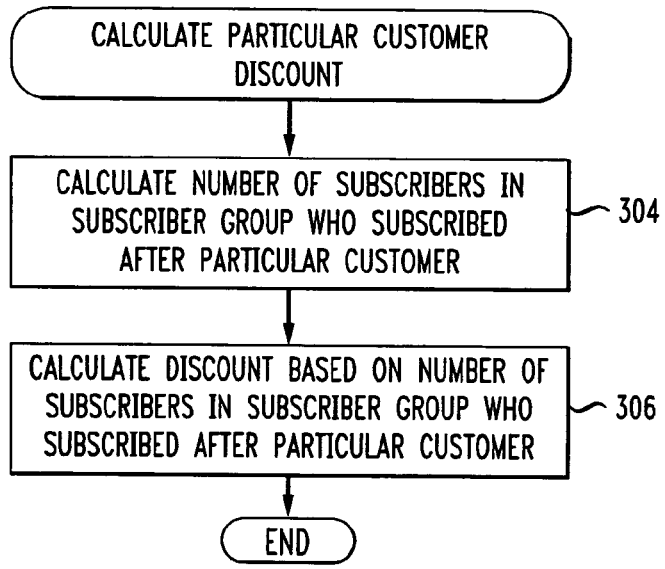
FIG. 3 is a flowchart showing the steps performed to calculate a particular customer discount.

FIG. 3 shows the steps performed to calculate a particular customer discount. First, in step 304, the subscription platform calculates the number of customers who subscribed after the particular customer. Next, in step 306 the subscription platform calculates an appropriate subsequent customer discount based on the number determined in step 304.

Figure 4:
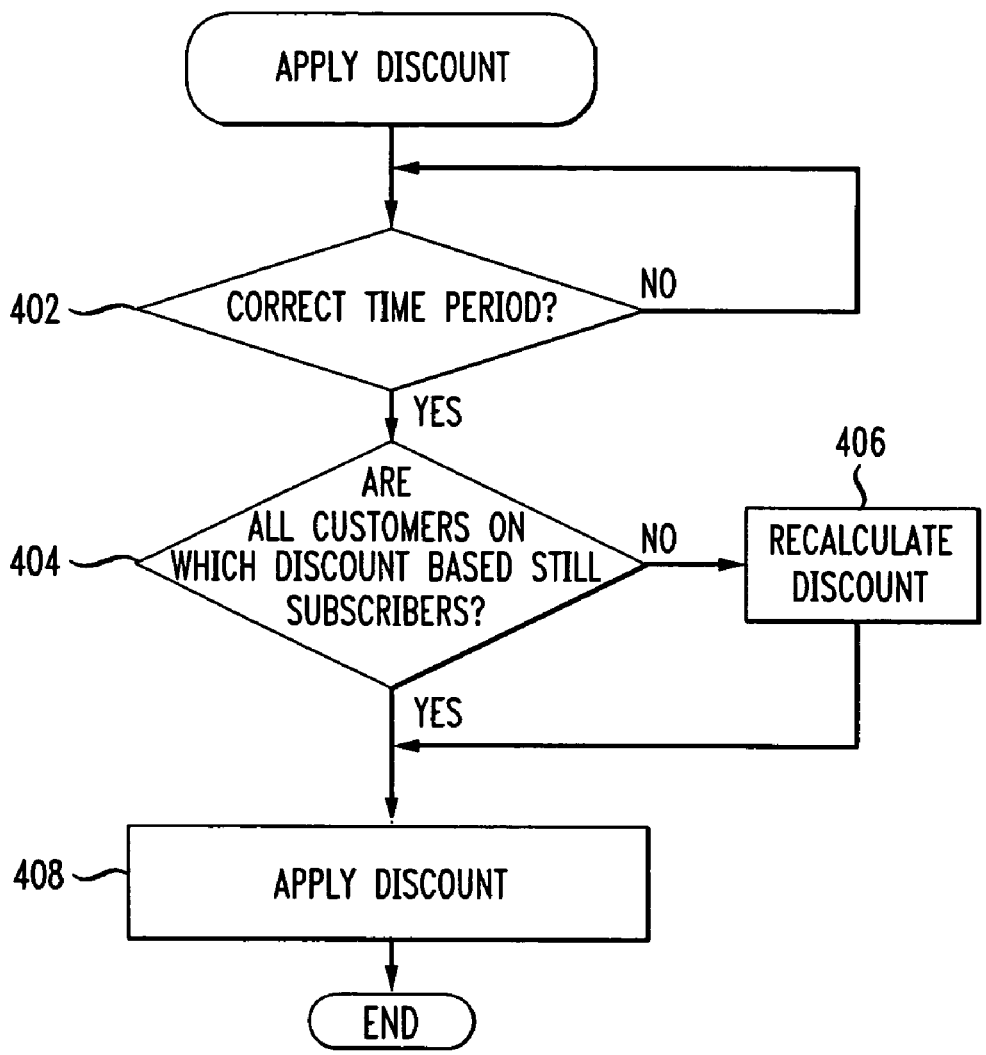
FIG. 4 is a flowchart showing the steps performed to apply a particular discount to a particular subscriber.

FIG. 4 shows the steps performed to apply a particular discount to a particular subscriber. First, in step 402 it is determined whether this is the correct time to apply the discount. As described above, the discount is applied toward the end of the subscription period. If the current time period is the correct time period, the it is determined in step 404 whether all the subsequent customers on which the subsequent customer credit was based, are still subscribers at the current time. If they are all still subscribers, then the discount is applied in step 408. If they are not all still subscribers, then the subsequent customer credit is recalculated in step 406 and then applied in step 408.

Of course, given the above description, one skilled in the art would recognize that there are many alternatives available, all of which are within the scope of the present invention. For example, while the steps of the flowcharts are described as being performed by the subscription platform, such steps may be performed by other processing units, and the steps may be distributed among several processing units. As another example, additional discounts and bonuses may be used. For example, an additional discount may be applied if all customers in a customer group subscribe to the service. As yet another alternative, one skilled in the art will recognize that the discount to be applied may be calculated at various times. Such discount may be calculated at the time a customer subscribes to the plan, during the plan period, or at the end of the plan period, depending upon the particular chosen implementation.

In one advantageous embodiment, the basic discount may be calculated as: Discount %=(number of subscribers/total number of customers in customer group)*50. Thus, for example, assume that out of a total customer group of 50 customers, 40 of them become subscribers. Then, according to the above equation, the basic discount % would be (40/50) *50=40, resulting in a 40% discount to each of the subscribers. Of course, other discount formulas could be used. Further, the subsequent customer credits may be applied in addition to the basic discount.

Figure 5:
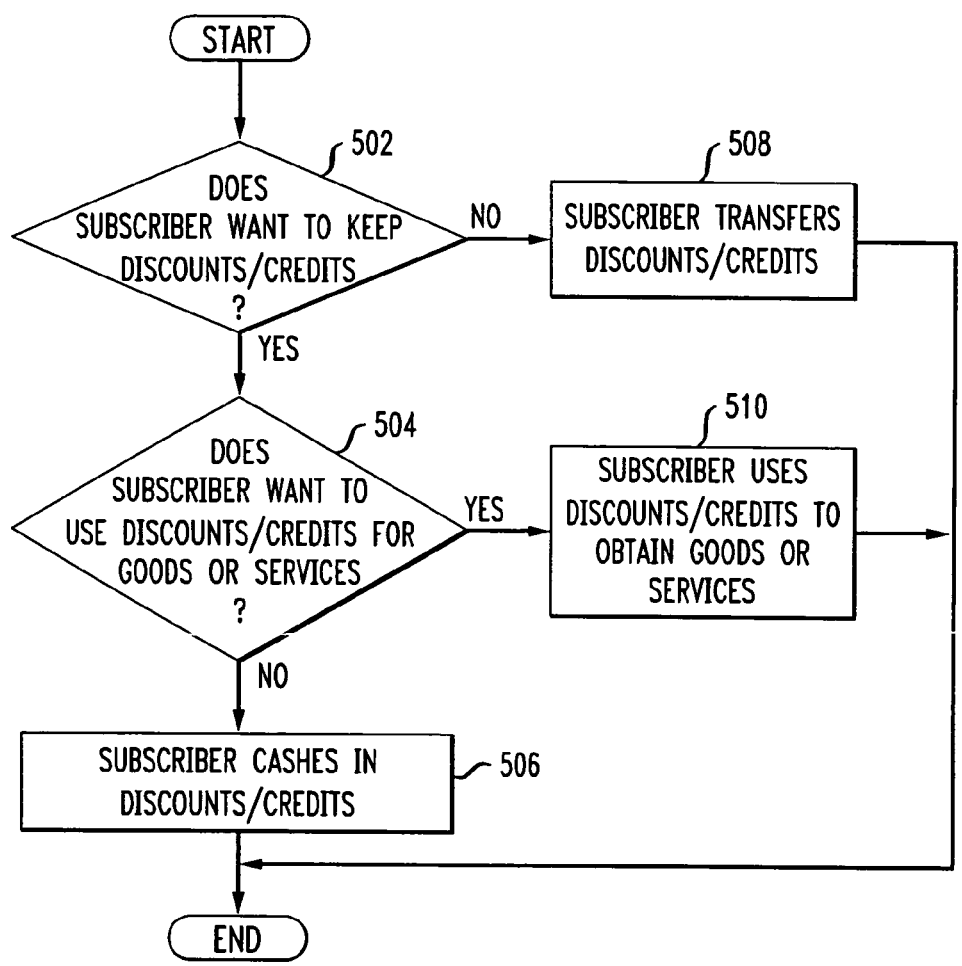
FIG. 5. is a flowchart showing the general steps to be performed in accordance with the banking aspects of the invention.

In another embodiment, rather than applying subscriber discounts and/or credits as described above, such credits and discounts may be "banked" in a subscriber account, for use at some later time or in some other way. For example, the system could allow for credits and discounts of a customer group to be applied to some organization (e.g., school) associated with the customer group. The credits/discounts could be transferable between customers. The credits/discounts could be convertible into currency. The credits/discounts could be used for other products/services from the service provider. The credits/discounts could be used for other products/services from third party organizations or merchants. FIG. 5 is a flowchart showing the general steps to be performed in accordance with an embodiment of the invention which utilizes these "banking" aspects. With reference to FIG. 5, first, in step 502, a subscriber is given a choice of keeping or transferring discounts/credits. If the subscriber wants to transfer the discounts/credits, then the subscriber may use, for example, a computer system to transfer discounts/credits to another subscriber or organization in step 508. In one embodiment, such discounts/credits could be transferred before they "vest" (i.e., before the particular discount/credit would be eligible to be applied to the transferring subscriber's account). If the subscriber wants to keep the discounts/credits, then in step 504 the subscriber may be given the choice of using the discounts/ credits to obtain goods or services (e.g., from a third party merchant or the service provider). If the subscriber chooses not to obtain goods or services, then in step 506 the subscriber may cash in the discounts/credits (e.g., for currency or like exchange). If the subscriber chooses to obtain goods or services, then in step 510 the subscriber may use, for example, a computer system to obtain goods and services in exchange for the discounts/credits.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, in various embodiments, a minimum credit/discount may be applied to each subscriber. In addition, marketing efforts and customer sign up could be performed in an auction type environment (e.g. world wide web auction) where customers could click acceptance from a registration cue. In yet other variations, if a subscriber moves, the subscriber may remain a member of the subscriber group.

The invention claimed is:

1. A method for providing telecommunication services to subscribers in a customer group comprising the steps of:
   receiving subscription requests from a plurality of subscribers in said customer group at a corresponding plurality of subscription times;
   storing in a database information associating each of said plurality of subscribers with a corresponding subscription time; and
   calculating service pricing plans for each of said plurality of subscribers based on each subscriber's subscription time relative to the plurality of subscription times for the subscribers in the customer group.

2. The method of claim 1 wherein said step of calculating service pricing plans further comprises the step of calculating discounts.

3. The method of claim 2 wherein a discount for a particular subscriber is based at least in part on a number of subscription requests received after the subscription request of said particular subscriber.

4. The method of claim 2 further comprising the step of applying said discounts at the end of a plan period.

5. The method of claim 1 wherein said service pricing plan is based, at least in part, on the number of said plurality of subscribers.

6. The method of claim 1 further comprising the step of:
   adjusting a subscriber's subscription time if said subscriber subscribes to an additional service.

7. A system for providing telecommunication services to customers in a customer group comprising:
   an interface for receiving subscription requests from a plurality of customers in said customer group at a corresponding plurality of subscription times;
   a database storing information associating each of said plurality of customers with a corresponding subscription time; and
   means for calculating service pricing plans for each of said plurality of customers based on each customer's subscription time relative to the plurality of subscription times for the plurality of customers in the customer group.

8. The system of claim 7 wherein said means for calculating service pricing plans further comprises means for calculating a discount.

9. The system of claim 8 wherein said discount for a particular subscriber is based at least in part on a number of subscription requests received after the subscription request of said particular subscriber.

10. The system of claim 8 wherein said discount for a particular subscriber is based at least in part on the number of said plurality of customers.

11. A method for providing telecommunication services to a plurality of subscribers of a customer group in accordance with a subscription plan having a subscription period and a plan period, said method comprising the steps of:
    receiving a subscription request from a particular one of said plurality of subscribers;
    receiving a plurality of subsequent subscription requests from others of said plurality of subscribers; and
    determining a discount for each subscriber based on each subscriber's subscription time relative to the plurality of subscribers' subscription times in the customer group.

12. The method of claim 11 wherein said subscription requests are received within said subscription period.

13. The method of claim 11 further comprising the steps of:
    storing a time at which said subscription request is received in a database record associated with said particular subscriber; and
    storing times at which said plurality of subsequent subscription requests are received in database records associated with said others of said plurality of subscribers.

14. The method of claim 11 further comprising the step of:
    applying said discount to an account of each subscriber.

15. The method of claim 14 wherein said discount is applied at the end of said plan period.

16. The method of claim 15 wherein said discount is adjusted based upon the number of said subsequent subscribers that remain subscribers to said subscription plan at the end of said plan period.

\* \* \* \* \*